Patented Apr. 16, 1935

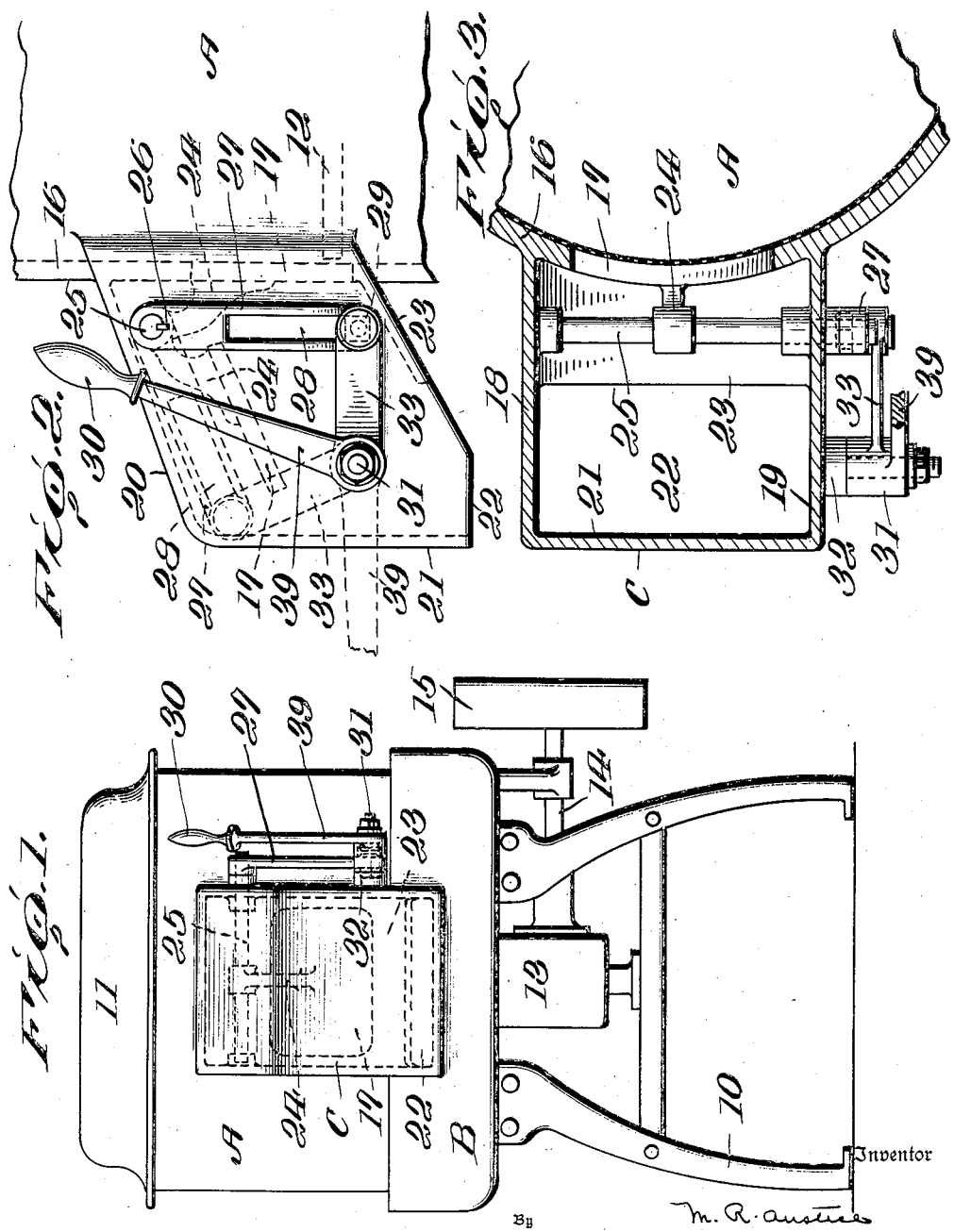

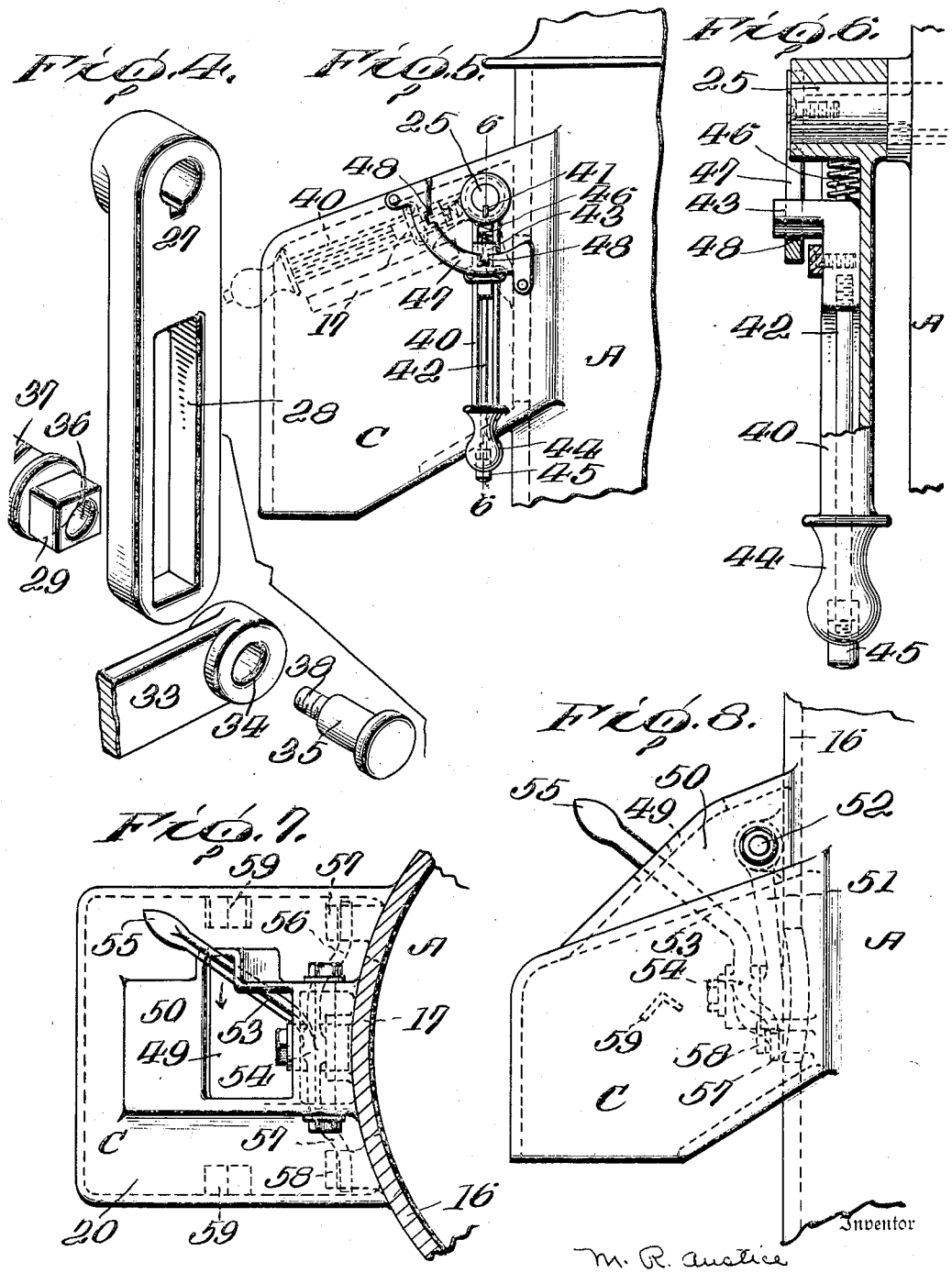

1,998,351

UNITED STATES PATENT OFFICE 1,998,351

DISCHARGE CHUTE

Mortimer R. Anstice and Cleland Coldwell Ross, Rochester, N. Y., assignors to Josiah Anstice & Co., Inc., Rochester, N. Y., a corporation of New York Application June 9, 1932, Serial No. 616,320

9 Claims. (Cl. 221—144)

The present invention relates to improvements in discharge chutes, particularly of the type adapted for use in connection with vegetable peeling machines.

The present invention has been conceived particularly for use in connection with potato peeling machines, wherein there is a peeling chamber coated with an abrasive material and a rotary disc in the bottom of said chamber also coated with an abrasive material. The disc agitates the potatoes and their action against the abrasive lining of the chamber, and the abrasive surface of the rotary disc effects a peeling of them. During the peeling operation, water is fed into the peeling chamber.

The peeled potatoes are discharged from the chamber through its side wall at a point adjacent the disc and as a consequence there will be discharged with the potatoes some of the wash water and possibly some of the peelings from the potatoes. It is desirable to control the discharged material and convey it to a receptacle and the present discharge chute has been conceived to provide an improved means for conveying the contents of the peeling chamber to a receptacle and the present improved chute is so constructed and designed that all of the discharged material is correctly and properly directed to the receiving container.

In addition to providing an improved discharge chute for the purpose above described, the chute has incorporated in its construction specific novel detailed features of constructions which result in an improved performance as will be hereinafter more specifically pointed out in detail.

In the drawings:—

Figure 1 is a view in front elevation of a peeling machine provided with my improved discharge chute.

Fig. 2 is a side view of the improved chute, a portion of the peeling chamber being shown in connection therewith.

Fig. 3 is a horizontal sectional view through the chute with a portion of the peeling chamber shown in connection therewith.

Fig. 4 is an enlarged detailed perspective view of a portion of the operating means of the chute door, parts being shown in strung out disconnected relation.

Fig. 5 is a view in side elevation of modified form of door and door operating means for the chute.

Fig. 6 is an enlarged detailed view partially in vertical section of the chute door operating handle used in the modified form of the invention illustrated in Fig. 5, the view being taken on the line 6—6 of Fig. 5.

Fig. 7 is a top plan view of a still further modification of chute door and door operating means.

Fig. 8 is a view of a side elevation of the form of the invention illustrated in Fig. 7.

Referring now to the drawings illustrating the invention in detail and referring particularly to the construction illustrated in Figs. 1 to 4, inclusive, of the drawings, A represents the peeling chamber of a vegetable peeling machine, which is supported upon a base B provided with supporting legs 10. The peeling chamber has an opening 11 in its top into which the potatoes and wash water are fed, and within the chamber at a point slightly above its bottom is positioned the rotatable peeling disc 12. This peeling disc has driving connection with a gear housing 13 mounted between the supporting legs. This gear housing is provided with an outwardly extended shaft 14 carrying at its end a suitable pulley 15 for driving connection with any suitable or well-known power means.

The construction thus far described is conventional of potato peeling machines many of which are now on the market having been manufactured and sold by the assignee of this present application.

In its side wall 16 at a point adjacent the disc the peeling chamber is provided with an opening, which during the peeling operation of the machine is closed by a door 17 to prevent escapement of any of the contents of the peeling chamber.

The discharge chute is designated as an entirety by C and in the form illustrated in the drawings is cast as an integral part of the side wall of the peeling chamber. This chute comprises side walls 18 and 19, and a top 20 which is inclined downwardly from the peeling chamber to its outer end where it meets the end wall 21 of the chute. The bottom of the chute has an opening 22 formed between the end wall 21 and the deflection plate 23. This deflection plate extends from the side wall of the peeling chamber at a point adjacent the bottom of the door opening in a downward and outward direction towards the end wall 21 of the chute, as clearly illustrated in Figs. 2 and 3 of the drawings.

The door 17 is provided with an outwardly extending arm 24 keyed to a rotatable shaft 25 supported between the side walls 18 and 19 of the chute. The shaft 25 extends outwardly through and beyond the side wall 19 of the chute, and to its end is keyed, as at 26, a slotted lever 27. When the door is in a closed position, this lever 27 is vertically disposed and in the lower end of its slot 28 carries a square block 29 adapted for reciprocation in the slot. A door operating handle 30 in the form of a bell crank lever is pivotally supported as at 31 on a stud 32 struck out from the side wall 19 of the chute. The arm 33 of this lever has its end provided with an opening 34 through which passes a stud 35. This stud 35 penetrates the arm, the opening 36 in the sliding block and beyond the sliding block carries a threaded nut 37, which is rotatable upon its screw threaded reduced end 38 whereby the arm 33 is secured to the sliding block and the sliding block in turn is secured within the slot 28.

In Fig. 2 of the drawings the door is shown closed in full line. Here it will be seen that the weight of the operating handle 30 and its arm 39 is at the right side of the pivotal point 31 of the bell crank lever with the result that there is a pressure upon the door to hold it closed.

It is to be further noted that the arm 33 and lever 27 are positioned substantially at right angles to one another with the result that these members lock the door against any pressure that may be exerted against the inner side of the door by the contents of the peeling chamber.

When the operating handle 30 is swung to the left to open the door, the parts assume the positions shown in dotted lines in Fig. 2, from which it will be seen that the weight of the operating handle 30 and its arm 39 tend to hold the door open and to keep the door open until it is closed by manual operation. Again the arm 33 and lever 27 are positioned at right angles to one another, thus locking the door in its open position until the handle is manually operated.

During the opening movement of the door, the block 29 has slid from the lower to the upper end of the slot 28 and back again to the lower end of the slot. During this movement of the block, the stud 35 has rotated within the opening 36 of the block.

It is to be noted that the construction provides a chute, which is fully closed except for its discharge opening 22 and that the chute will completely and absolutely confine the discharge of the vegetables and wash water and guide them onto any suitable container, which may be placed beneath the opening 22 of the chute. Furthermore, a simple mechanism has been provided whereby the door is easily and readily opened and closed through a single movement of the door operating handle 30. Additionally the construction is such that the door of its own accord will remain in a closed or opened position as may be desired. When the door is opened, it parallels the top of the chute and is sufficiently out of line with the discharge from the peeler to prevent its becoming an obstruction.

The present chute construction is of a decided advantage over chutes now known and in use in that it prevents the splashing or discharge of either water or vegetables other than to the exact point where discharge is desired.

In the modification shown in Figs. 5 and 6, a different form of operating handle for the door is illustrated. In this form of the invention the shaft 25 at its end carries a straight operating handle 40 which is keyed to the shaft as at 41, and is provided with a reciprocable rod 42, one end of which carries an outwardly extending detent 43 while its other end penetrates the hand grasp portion 44 of the handle and terminates in a push-button 45. This rod 42 is movable against the tension of a coil spring 46.

A segment 47 having therein notches 48 adapted to receive the detent 43 is suitably secured to the side wall of the chute. When the door is in a closed position, the detent engages one of the notches 48 and locks the door against opening. The door in its opened position is shown in dotted lines in Fig. 5 of the drawings and here it will be seen that the detent is engaging the other notch of the segment and locking the door in an opened position with the door paralleling the closed top of the chute.

In this form of invention, the chute proper is constructed just as it is constructed in the preferred form of the invention.

Figs. 7 and 8 illustrate another form of door operating means but here again the chute proper is constructed just as it is constructed in the preferred form of the invention with the exception that its top 20 is provided with an opening 49 formed in a bulged out portion 50 immediately above but formed integral with the chute top. The door 17 is provided with an arm 51 having pivotal connection with a shaft 52 supported between the side walls of the bulged portion 50 of the chute. The door is operated by a handle 53, one end of which is pivotally connected as at 54 to the door while its other end 55 extends outwardly through the opening 49 in the chute top. The end 54 of the handle is provided with outwardly extending arms 56 and 57 adapted to engage the L-shaped extension locks 58 struck out from the side wall 16 of the chamber at opposite sides of the door opening and thus hold the door in a locked closed position. When the door is in a locked and closed position, the arm 53 has been swung to a position illustrated in Fig. 7 of the drawings.

When it is desired to open the door, the door handle 55 is swung in the direction indicated by arrow which will cause the arms 56 and 57 to become disengaged with the locks 58 and permit the door to be swung upwardly towards the top of the chute. When the door is sufficiently lifted, the handle 55 can be moved still further in the direction indicated by arrow to cause the arms 56 and 57 to move into a position behind the L-shaped projection locks 59 to hold the door in a locked open position. Thus it will be seen that the handle 55 in opening and in closing the door is swung from left to right and is also moved toward and away from the peeler. The opening 59 is sufficiently large to permit the necessary door handle movement to accomplish the opening and closing of the door and the locking of the door in either of its positions.

Having thus described our invention, what we claim and desire to obtain by Letters Patent is:

1. In a peeling machine, an outlet opening and a door therefor, a door operating handle, a covered chute for receiving material discharged from said outlet opening, locks at the opposite sides of said door, locks on the sides of said chute, and arms operated by the door operating handle and adapted to engage either of said locks for locking the door in either an open or closed position, as desired.

2. In a peeling machine, an outlet opening and a door therefor, a covered chute for receiving material discharged from said outlet opening, the cover of said chute being provided with an opening, a door operating handle having attachment with the door and provided with an extending handle operating portion extending through said chute cover opening, locks on the machine and locks on the inner side of said chute, and arms operated by the door operating handle and adapted to engage either of said locks for locking the door in either an open or a closed position, as desired.

3. In a peeling machine, an outlet and a door therefor, a covered chute for receiving material discharged through said peeler outlet, a door operating mechanism, the cover of said chute provided with an opening through which said door operating mechanism extends, and means in said chute co-operating with the door operating mechanism for holding the door open and in a position parallel to the cover of said chute and beneath the opening in said chute cover, whereby said door forms no obstruction to the free passage of material out of the chute and will form a closure against the passage of material out of the chute cover opening.

4. In a peeling machine, an outlet opening and a door therefor, a covered chute for receiving material discharged from said peeler outlet opening, a door pivotally supported upon said chute for closing said outlet opening, an operating handle for swinging said door upon its pivotal support, said door operating handle extending from said door through and beyond said chute, locks on said peeling machine adjacent the door opening, locks in said chute, and means forming a part of said door operating handle adapted to engage either of said locks for locking the door in either an open or a closed position, as desired.

5. In a peeling machine, an outlet opening and a door therefor, a covered chute for receiving material discharged from said peeler outlet opening, a door operating handle pivotally connected to the door and extending from the door outwardly through and beyond said chute, a lock on said peeling machine adjacent the outlet opening, locks on the sides of said chute, said door operating handle provided with an arm adapted to engage either of said locks and said door operating handle adapted to move said door and to have its arm engage either of said locks for locking the door in a closed position or in an open position beneath and parallel to the cover of said chute, for the purpose described.

6. In a peeling machine, an outlet and a door therefor, a covered chute for receiving the material discharged through said peeler outlet, a door operating mechanism, the cover of said chute provided with an opening through which said door operating mechanism extends, and means for holding the door open and in a position parallel to the cover of said chute and beneath the opening therein, whereby said door forms no obstruction to the free passage of material out of the chute and will form a closure against the passage of material through the chute cover opening.

7. In a peeling machine, a peeling chamber having an outlet opening adjacent its lower end provided with a door, an operating mechanism for said door, an outwardly and downwardly extending covered chute having an opening in its lower end, said chute being positioned to receive material discharged through said peeler chamber outlet opening, and means positioned within said chute and cooperating with the door operating mechanism for holding the door open and in a position beneath and parallel to the cover of said chute.

8. In a peeling machine, a peeling chamber having an outlet opening adjacent its lower end and a door therefor, a door operating handle, a covered chute for receiving material discharged from said chamber outlet opening, an arm movably mounted and operable by said door operating handle, means engageable by said arm for locking the door in a closed position, and means carried within the chute and engageable by said arm for locking the door in an open position.

9. In a peeling machine, a peeling chamber having an outlet opening adjacent its lower end and a door therefor, a door operating handle, a covered chute for receiving material discharged from said chamber outlet opening, an arm movably mounted and operable by said door operating handle, means engageable by said arm for locking the door in a closed position, and means carried within the chute and engageable by said arm for locking the door in an open position beneath and parallel to the cover of said chute.

MORTIMER R. ANSTICE.
CLELAND COLDWELL ROSS.